United States Patent [19]
Tamburino et al.

[11] 3,905,616
[45] Sept. 16, 1975

[54] SPLASH GUARD ARRANGEMENT
[75] Inventors: James C. Tamburino, Roselle; George Zaborsky, Westchester, both of Ill.
[73] Assignee: International Harvester Company, Chicago, Ill.
[22] Filed: July 12, 1974
[21] Appl. No.: 488,132

[52] U.S. Cl. .................. 280/154.5 R; 298/1 SG
[51] Int. Cl.² .................................. B62D 25/16
[58] Field of Search ........... 280/154.5 R; 298/1 SG

[56] References Cited
UNITED STATES PATENTS

| | | | |
|---|---|---|---|
| 3,319,976 | 5/1967 | Eckerman | 280/154.5 R |
| 3,713,669 | 1/1973 | Evans | 280/154.5 R |
| 3,802,739 | 4/1974 | Knyszel et al. | 280/154.5 R X |
| 3,806,196 | 4/1974 | Cole et al. | 280/154.5 R X |

Primary Examiner—Kenneth H. Betts
Assistant Examiner—Michael J. Forman
Attorney, Agent, or Firm—William H. Wendell; Floyd B. Harman

[57] ABSTRACT

A splash guard arrangement which limits the pattern of discharge from the rear wheels of a dump truck while minimizing the possibility of the splash guard being trapped either under the rear wheel of the truck or under the load of the truck when it has been dumped.

8 Claims, 7 Drawing Figures

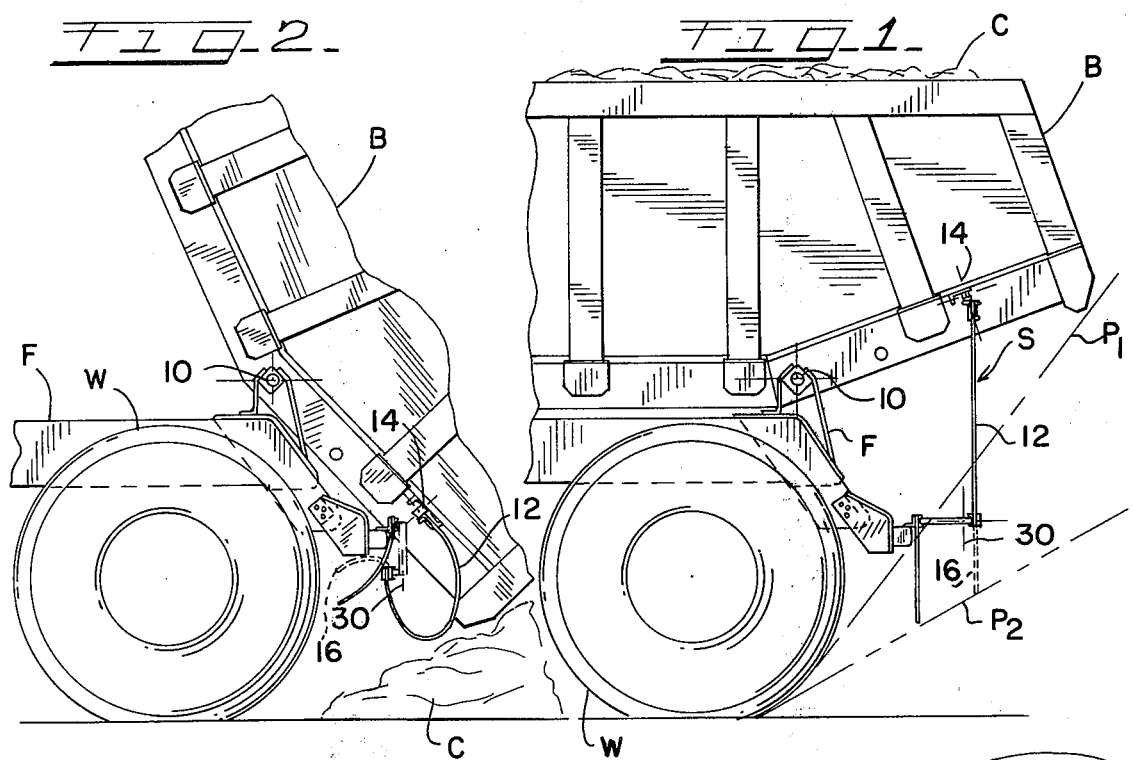
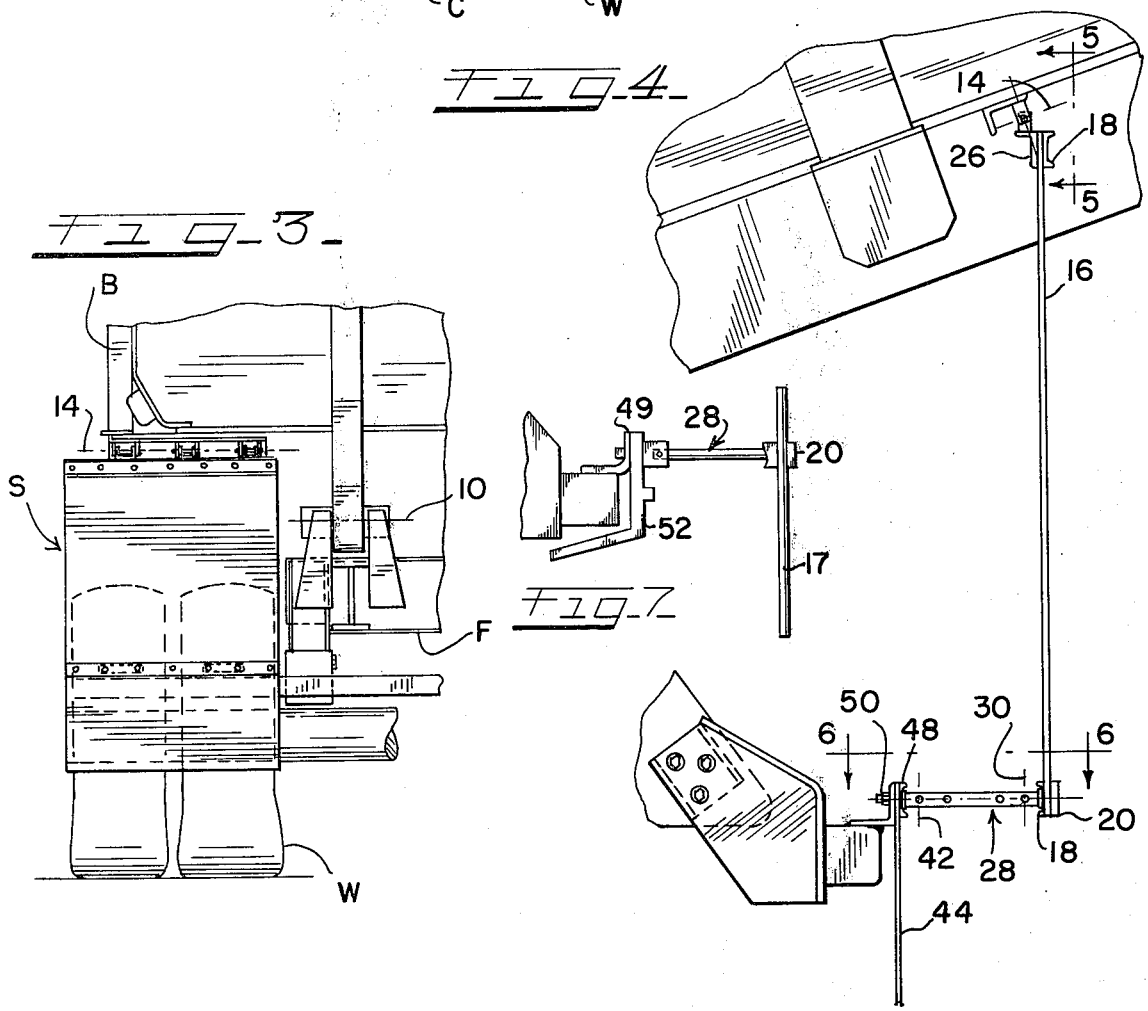

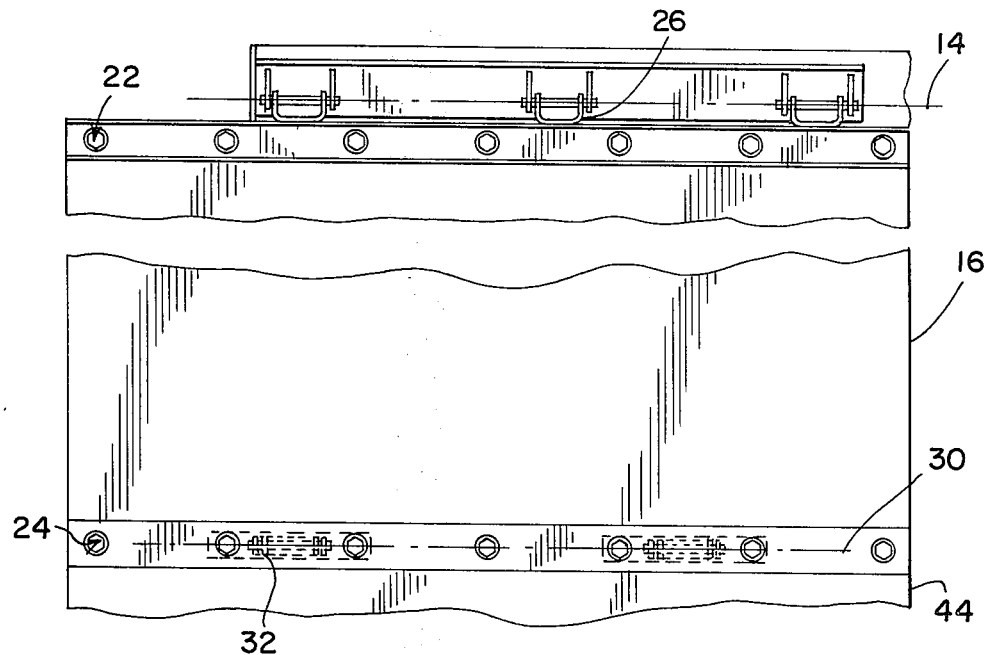
FIG_5_
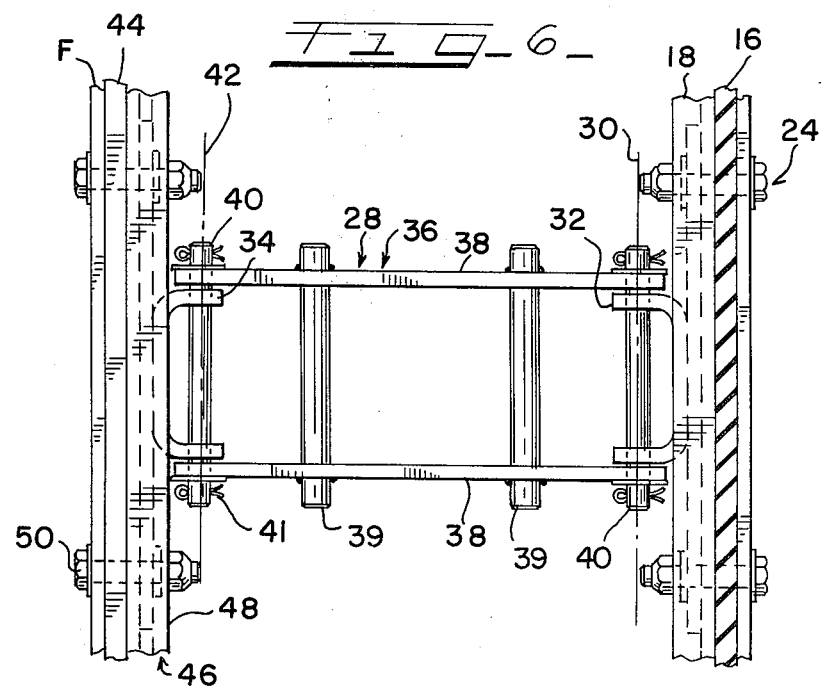
FIG_6_

SPLASH GUARD ARRANGEMENT

BACKGROUND OF THE INVENTION

This invention relates to splash guards located rearward of a truck's rear wheels to limit their discharge of mud and other material that may injure pedestrians or damage vehicles which are behind or along side the moving truck.

This method of protecting people and their property is only one of many protective measures that have been a long time consideration of industry. The desirability of such devices has been given emphasis with the recent passage of safety standards by various voluntary engineering associations, for example, Society of Automotive Engineers. These attempts to establish relative uniformity in design evaluation have spawned a commercial advantage in having protective mechanisms that can be uniformly applied to all the vehicles within a generic class.

One such protective mechanism is in providing of fenders and/or splash guards for the rear wheels of trucks which have load dumping bodies. The existing apparatus for over the road vehicles are not capable of uniform application because they are not acceptable when applied to off the road dump trucks.

The existing over the road apparatus involve auxiliary systems which are excessively susceptible to failure caused by the hazardous task of being part of a tool that is changing the appearance of the earth's crust. In this environment the tools must be simple, strong and effective before they can withstand exposure to the rough terrain, mud, clay, gravel, rocks and extreme weather conditions.

The existing over the road apparatus are also not the optimum design in this area of application because of the mandatory shape of the off the road dump trucks. The vehicles carry loads that vary from one large boulder to fine dirt. To ensure that the center of gravity of the load does not create a hazard by falling behind the rear wheels of the truck, the bed of the dump body must be sloped downward and forward from its rearward most edge to at least the centerline of the rear axle. This body shape dictates that the pivot point for the body be located at or near the rearward edge of the truck's frame. To adequately enclose the resulting large discharge area, the off the road splash guards must have greater vertical heights than those of the over the road vehicles. The combination of these two factors make the adaption of the existing over the road apparatus to the off the road vehicles a difficult task, if possible, with the result being less than a theoretical optimum desired.

In addition to incorporating the rugged environment and the restrictive body shape into the design of a splash guard device for off the road dump trucks, the device must also overcome the problems of being trapped under the dump load or being pinned against the rear wheels by the load. The first condition will cause damage to or destroy the device when the vehicle is moved either forward or rearward, while the second condition will cause damage to or destroy the device when the vehicle is moved rearwardly.

The existing off the road systems do not adequately protect against these sources of damage to the splash guard. These systems are also incapable of being uniformly applied to over the road dump trucks because they are designed to function only with the slanted bed configuration. Accordingly it is the primary aim of the present invention to overcome the problems of the prior systems while providing a functional and practical splash guard means for limiting the discharge pattern of the rear wheels of a dump truck.

With more particularity, it is an object of the present invention to provide a splash guard means which is relatively inexpensive and relatively resistant to the abrasive characteristic of its environment while restricting the discharge pattern of the rear wheels of the dump truck to its prescribed limts.

An additional object of the present invention is to adequately restrict the discharge pattern of the rear wheels of dump trucks while keeping the splash guard device from becoming trapped under the dump load or pinned against the rear wheels by the dump load.

Finally, another object of the present invention is to provide a configuration of the class described which is easy to install and easy to maintain and dependable in its operation.

SUMMARY OF THE INVENTION

In accordance with the invention the splash guard means will function on a dump truck which has its tiltable body pivoted near the rear end of the truck's frame. The splash guard means will include a flexible splash guard means which restricts the discharge pattern of the rear wheels of the truck, a rigid splash guard means which can either restrict both the movement of the flexible splash guard means and the discharge pattern of the truck's rear wheels or only restrict the movement of the flexible splash guard means, a frame connecting means attaching the rigid splash guard means to the truck's frame and a connecting means that pivotally connects the flexible and rigid splash guard means.

BRIEF DESCRIPTION OF THE DRAWINGS

FIG. 1 is a side view of the rear portion of an off the road dump truck with the splash guard means and the truck dump body in the transport position;

FIG. 2 is a view similar to FIG. 1, but showing the truck's dump body and the splash guard means in its unload or dump position;

FIG. 3 is a partial end view of an off the road dump truck showing the splash guard means location with respect to the rear wheels of the vehicle;

FIG. 4 is an exploded side view of the preferred embodiment of the splash guard means showing the elements of the preferred embodiment;

FIG. 5 is an exploded partial end view, taken on line 5—5 of FIG. 4, of the preferred embodiment's splash guard means depicting the mounting and connecting means of the embodiment; and FIG. 6 is an exploded plan view, taken on line 6—6 of FIG. 4, of the preferred embodiment's connecting means FIG. 7 is an exploded plan view of an alternative stop means configuration.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Turning first to FIG. 1, there is shown the rear section of an off the road dump truck with its tiltable dump body B in its transport position over the truck frame F. This view also depicts the splash guard means S interposed between the tiltable dump body B and the truck frame F.

The splash guard means S is connected to these two elements of the truck rearward of the rear wheels W of the vehicle. Combining this position of the splash guard means S with its location directly behind the rear wheels W, as shown in FIG. 3, the splash guard means S limits the normal discharge pattern P1 of the rear wheels W to the discharge pattern P2 shown in FIG. 1.

The normal discharge pattern P1 for the off the road dump truck is appreciably larger than the normal discharge pattern of an over the road dump truck because of the difference in the shape of the rear portion of the vehicles. On an over the road dump truck the frame and the tiltable dump body are both horizontal over their entire length with the distance between their rearward ends being relatively small. However, on an off the road dump truck the rearward section of the tiltable dump body must be sloped up from the horizontal, shown in FIG. 1, to ensure that the center of gravity of the material cargo C would be forward of the rear wheels. This upward slope of the body will allow the safe handling of the large variety of material cargo C that it will contain (i.e. boulders, gravel, dirt, etc.), but it does require that the rearward end of the horizontal frame F of the truck be terminated further from the rearward end of the tiltable body than in the case of the over the road vehicle. This requirement results from the greater rotation of the tiltable dump body B of an off the road vehicle necessary to provide satisfactory unloading of the cargo C. The result of this difference in configuration of the rear sections of the dump truck is that the splash guard for an off the road dump truck must block a greater vertical area of discharge to produce a restricted discharge pattern that is the same as the pattern for an over the road vehicle.

In keeping with one of the principle objects of the invention a splash guard means S is designed to avoid being pinned against the rear wheels W or trapped in the material cargo C of the truck when the material cargo is unloaded, regardless of the configuration of the rear section of the truck. This unloading position is depicted in FIG. 2 where the tiltable dump body B of the truck is shown pivoted about the truck's frame F along the centerline 10.

In this unloading position an extra length of the splash guard means S, resulting from the configuration of the off the road vehicles, avoids being trapped in the unloaded cargo C or pinned against the rear wheels by the unloaded cargo C, by having the flexible splash guard means 12 of the splash guard means S elastically bend into the "U" shape shown in FIG. 2. Since the splash guard means of the present invention is a small structure when compared to the dump truck to which it is attached, it is necessary to use exploded views, FIGS. 4, 5, and 6, to adequately describe the structure of the preferred embodiment of the splash guard means.

In the particular device illustrated, the upper section of the flexible splash guard means 12 is pivotally connected to the tiltable dump body B at three locations along centerline 14. The preferred embodiment's flexible splash guard means 12 consists of a flexible upper splash guard means 16, top-bottom stiffening means 18, lower stiffening means 20, retaining means 22, shown in FIG. 5, attaching means 24, shown in FIGS. 5 and 6, and upper mounting means 26 shown in FIGS. 4 and 5. The upper mounting means 26, the top-bottom stiffening means 18 and a lower stiffening means 20 add rigidity and tear strength to the mounting areas of the flexible splash guard means 12, while the upper mounting means 26 also pivotally connects the flexible splash guard means 12 to the tiltable dump body B along centerline 14.

The lower section of the flexible splash guard means 12 is pivotally connected to the connecting means 28 by the rearward pivotal mounting means 32 at two locations along centerline 30. As shown in FIG. 6, the preferred embodiment of the connecting means 28 consists of the rearward pivotal mounting means 32, the forward pivotal mounting means 34 and the connecting link means 36. In the particular device illustrated, the connecting link means 36 includes at each location two side plates 38, two rods 39 which provide rigidity for the connecting means 28 by being welded to the side plates 38, two pins 40 which act as pivots and four retaining means 41 which secure pins 40 to the side plates 38.

As depicted in FIG. 6 the rearward pivotal mounting means 32 of the connecting means 28 is rigidly attached at each mounting location to the flexible splash guard means 12 by attaching means 24. The connecting means 28 is pivotally attached at two locations along centerline 42 to the truck frame F by rigidly affixing the forward pivotal mounting means 34 and the flexible lower splash guard means 44 to the truck frame F with the frame connecting means 46. In the preferred construction the lower splash guard means 44 limits the discharge pattern to the rear wheels W shown in FIG. 1. In the illustrated form the frame connecting means 46 includes a mounting plate 48 and affixing means 50, with the mounting plate 48 acting as a motion limiter for the flexible splash guard means 12, as shown in FIG. 2.

From the foregoing it will be seen that as the tiltable dump body B pivots about the truck frame F from the transport position of FIG. 1 to the unloading position of FIG. 2, the splash guard means S will move in the following manner. The flexible splash guard means 12 will pivotally descend until the motion of the connecting means 28 is restricted by the mounting plate 48. At this stage of the unloading cycle the lower splash guard means 44 is deflected and the flexible splash guard means 12 will begin to deflect by pivoting counterclockwise about centerline 14 and clockwise about centerline 30 as seen in FIG. 2. The deflection of the flexible splash guard means 12 will achieve a shape similar to the "U" shape depicted in FIG. 2 when the tiltable dump body B has attained the unloading position shown there. This deflection insures that the splash guard means S will function without excessive damage being caused by the unloading of the material cargo C.

While the invention has been described in connection with a lower splash guard means 44 that limits rear wheel W discharge pattern with the mounting plate 48 limiting the motion of the flexible splash guard means 12, one skilled in the art will appreciate that the invention is not necessarily so limited in that the principle objects could be accomplished with a stop means replacing the lower splash guard means 44 and the mounting plate 48. This replacement would require some modification of the other structural elements of the splash guard means S but could be accomplished without affecting the function of the splash guard means S. One such configuration is shown in FIG. 7 which depicts the combination of the stop means 52 and the modified flexible upper splash guard means 17 with the transport and dump positions shown in phantom and FIGS. 1 and 2.

Thus it is apparent that there has been provided, in accordance with the invention, a splash guard means that is relatively resistant to the abrasive environment because it consists of simple tough structural elements, is relatively inexpensive since simple members can be combined to perform the function, is an effective limiter of the rear wheel discharge pattern of a dump truck since it will not be damaged in the unloading cycle and is relatively easy to install and reliable in operation since there is no highly sophisticated equivalent required by the simple components.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A splash guard means for the rear wheels of a dump truck with a tiltable dump body pivoted near the rear end of the frame of the truck, said splash guard means comprising, in combination:
    a flexible splash guard means having an upper section and a lower section, said upper section pivotally connected to said dump body rearward of said rear wheels for limiting the pattern of discharge from said rear wheels;
    a frame connecting means for restricting the rotational movement of said flexible splash guard means;
    a lower splash guard means operatively connected by said frame connecting means to said frame rearward of said rear wheels for limiting the pattern of discharge from said rear wheels;
    a connecting means pivotally attached to said lower section of said flexible splash guard means and said frame rearward of said rear wheels for limiting the vertical travel of said lower section.

2. The combination of claim 1, further defined by said flexible splash guard means comprising:
    a flexible upper splash guard means having an upper section and a lower section for limiting the pattern of discharge from said rear wheels;
    a top-bottom stiffening means for obtaining rigidity and gaining tear strength in said upper and lower sections of said flexible upper splash guard means;
    a lower stiffening means for obtaining rigidity and gaining tear strength in said lower section of said flexible upper splash guard means;
    an attaching means rigidly interconnecting said flexible upper splash guard means, said top-bottom stiffening means and said lower stiffening means;
    an upper mounting means for pivotally connecting said tiltable dump body and said upper section of said flexible upper splash guard means;
    a retaining means for rigidly interconnecting said flexible upper splash guard means, said top-bottom stiffening means and said upper mounting means.

3. The combination of claim 2 further defined by said connecting means comprising:
    a connecting link means for limiting the vertical travel of said lower section of said flexible upper splash guard means;
    a rearward pivotal mounting means for pivotally connecting said connecting link means and said lower section of said flexible splash guard means;
    a forward pivotable mounting means for pivotally connecting said connecting link means and said frame rearward of said rear wheels.

4. The combination of claim 1, further defined by said connecting means comprising:
    a connecting link means for limiting the vertical travel of said lower section of said flexible upper splash guard means;
    a rearward pivotal mounting means for pivotally connecting said connecting link means to said lower section of said flexible splash guard means;
    a forward pivotable mounting means for pivotally connecting said connecting link means and said frame rearward of said rear wheels.

5. A splash guard means for the rear wheels of a dump truck with a tiltable dump body pivoted near the rear end of the frame of the truck, said splash guard means comprising, in combination:
    a flexible splash guard means having an upper section and a lower section, said upper section pivotally connected to said dump body rearward of said rear wheels for limiting the pattern of discharge from said rear wheels;
    a stop means operatively connected to said frame rearward of said rear wheels for restricting the rotational movement of said flexible splash guard means;
    a connecting means pivotally attached to said lower section of said flexible splash guard means and said frame rearward of said rear wheels for limiting the vertical travel of said lower section.

6. The combination of claim 5, further defined by said flexible splash guard means comprising:
    a flexible upper splash guard means having an upper section and a lower section for limiting the pattern of discharge from said rear wheels;
    a top-bottom stiffening means for obtaining rigidity and gaining tear strength in said upper and lower sections of said flexible upper splash guard means;
    a lower stiffening means for obtaining rigidity and gaining tear strength in said lower section of the flexible upper splash guard means;
    an attaching means for rigidly interconnecting said flexible upper splash guard means, said top-bottom stiffening means and said lower stiffening means;
    an upper mounting means for pivotally connecting said tiltable dump body and said upper section of said flexible upper splash guard means;
    a retaining means for rigidly interconnecting said flexible upper splash guard means, said top-bottom stiffening means and said upper mounting means.

7. The combination of claim 6 further defined by said connecting means comprising:

a connecting link means for limiting the vertical travel of said lower section of said flexible upper splash guard means;

a rearward pivotal mounting means for pivotally connecting said connecting link means and said lower section of said flexible upper splash guard means;

a forward pivotal mounting means pivotally connecting said connecting link means and said frame rearward of said rear wheels.

8. The combination of claim 5, further defined by said connecting means comprising:

a connecting link means for limiting the vertical travel of said lower section of said flexible splash guard means;

a rearward pivotal mounting means for pivotally connecting said connecting link means and said upper section of said flexible splash guard means;

a forward pivotable mounting means for pivotally connecting said connecting link means and said frame rearward of said rear wheels.

* * * * *